United States Patent Office 3,514,599
Patented May 26, 1970

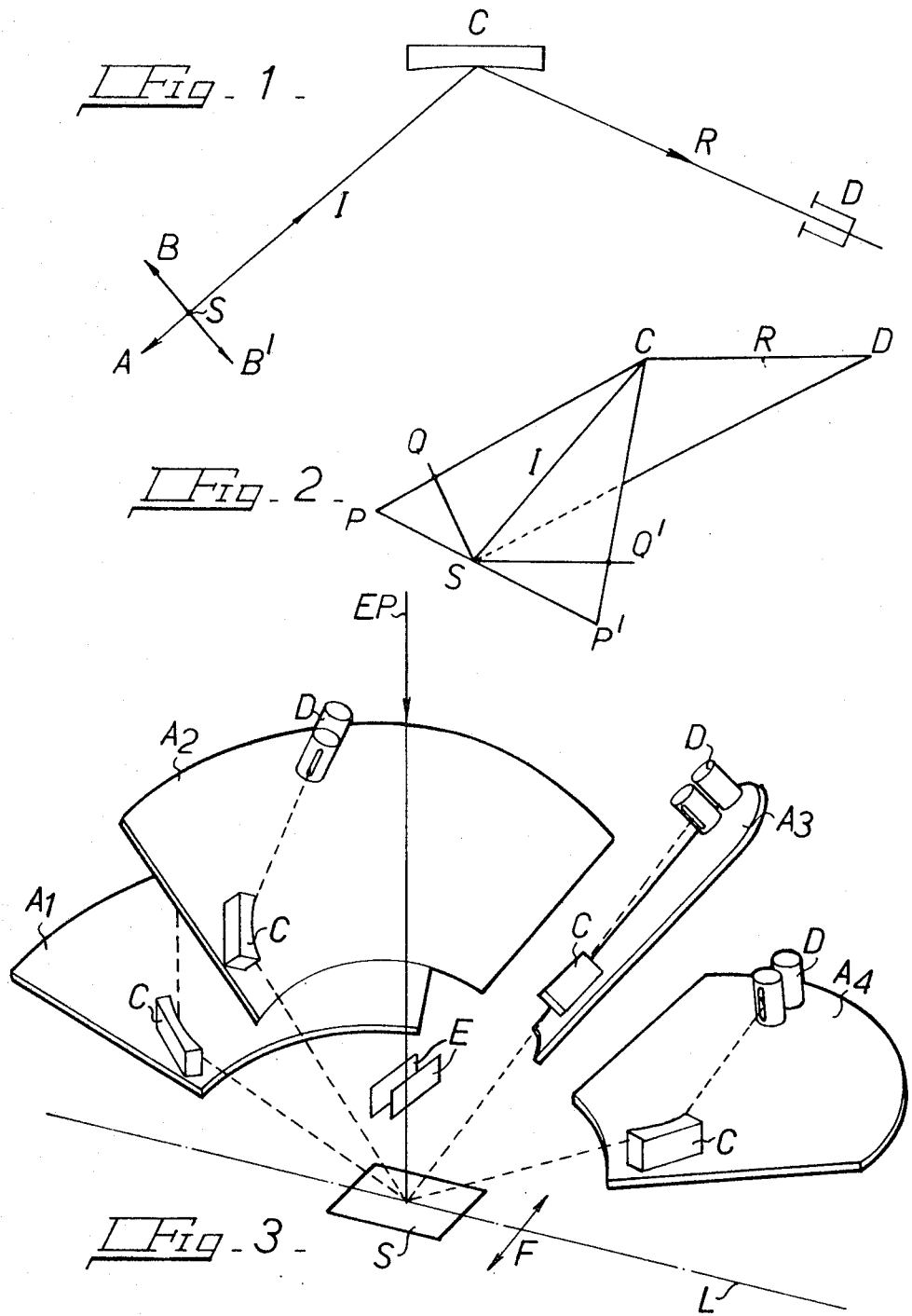

3,514,599
ELECTRON PROBE MICROANALYZER HAVING A PLURALITY OF X-RAY SPECTROMETERS POSITIONED TO MINIMIZE X-RAY DEFOCUSSING DURING SPECIMEN SCANNING
Alistair John Campbell, Cambridge, England, assignor to Cambridge Instrument Company Limited, London, England, a British company
Filed Feb. 16, 1968, Ser. No. 706,002
Claims priority, application Great Britain, Feb. 16, 1967, 7,462/67
Int. Cl. H01j 37/28; G01n 23/20
U.S. Cl. 250—49.5
6 Claims

ABSTRACT OF THE DISCLOSURE

In a scanning electron probe X-ray micro-analyser employing at least three separate X-ray spectrometers of the crystal or grating type, the electron beam is caused to scan the specimen surface in only one dimension along a given line and the spectrometers are arranged around the specimen in such a manner that the plane of each spectrometer contains a line that is perpendicular both to the above-mentioned given line and to the path of the X-rays from the specimen to the spectrometer, thereby allowing the maximum number of spectrometers to be used with the minimum of de-focussing resulting from the scan.

---

This invention relates to scanning electron probe micro-analysers, in which a probe in the form of an electron beam is caused to scan a selected area of the surface of a specimen and the resulting X-rays emanating from the specimen as a result of the impingement of the electrons are detected and analysed by means of dispersive spectrometers employing either crystals or diffraction gratings.

Normally, in a scanning micro-analyser, the electron beam is scanned in two mutually perpendicular directions in the manner of a raster, to cover a small rectangular area of the specimen. Although it is possible to leave the electron beam on a fixed point and to move the specimen itself in two mutually perpendicular directions to achieve the same result, this scanning by mechanical movement of the specimen is much too slow for practical purposes. The scanning of the probe, however, has its own disadvantage, in that, as the probe is scanned over the surface of the specimen, the source of the X-rays passing to the spectrometer moves and this upsets the apparent sensitivity of the spectrometer and produces false results.

It has recently been proposed to obtain the advantages of both methods without their disadvantages by adopting the so-called "hybrid" scanning, in which the scanning in one direction is achieved by moving the specimen and the scanning in the perpendicular direction by moving the electron beam. This is based on an appreciation of the fact that shifting of the source of the X-rays in certain directions has only a second order effect on the apparent sensitivity of the spectrometer, and the direction of scanning of the beam is chosen to be one of these so-called "privileged" directions. Where the plane of the spectrometer is defined as that plane which contains the paths of both the incident and reflected X-rays, the privileged directions lie in a plane which is perpendicular to that plane and contains the path of the incident X-rays. The direction of scanning of the electron beam is arranged to be along that line in which the surface of the specimen intersects this privileged plane, and the direction of mechanical scanning of the specimen is along a line perpendicular to this line.

Such a layout is suitable where there is only a single spectrometer and a scan of reasonable duration can be obtained, without the source of the X-rays shifting in a manner that will upset the apparent sensitivity of the spectrometer. It is also not difficult to see that a second spectrometer could be disposed symmetrically on the opposite side of the beam to the first, both spectrometers having their planes coincident with each other and containing the path of the electron beam. However, where it is desired to use three or more spectrometers arranged symmetrically around the specimen, as is done already to analyse three or more different elements simultaneously, it will be appreciated that the direction of electron beam scanning that is suitable for one spectrometer is not suitable for the others. The aim of the present invention is to overcome this problem and to allow three or more spectrometers to be used simultaneously in conjunction with electron beam scanning along a line.

According to the invention we now propose that each of three or more crystal or grating spectrometers should be arranged around the specimen in such a manner that, considering a given line on the specimen which is the selected direction of electron beam scanning and which we will call the datum line, the plane of each spectrometer (as defined above) contains a line which is perpendicular both to the datum line and to the path of the incident X-rays of that spectrometer. It will be understood that, within the limits governed by the physical bulk of the spectrometers, any number of spectrometers can be arranged to comply with this requirement simultaneously. Moreover it is even possible for several spectrometers to comply with this requirement simultaneously and at the same time all to have the same take-off angle, i.e. the paths of the incident rays for all the spectrometers make the same angle with the plane of the specimen surface.

The invention will now be further described by way of example with reference to the accompanying drawings, in which:

FIG. 1 is a diagrammatic illustration of an X-ray spectrometer for purposes of explanation;

FIG. 2 is a perspective view showing the privileged plane;

FIG. 3 is a substantially simplified perspective view of one embodiment of the inveniton.

Figure 4A:
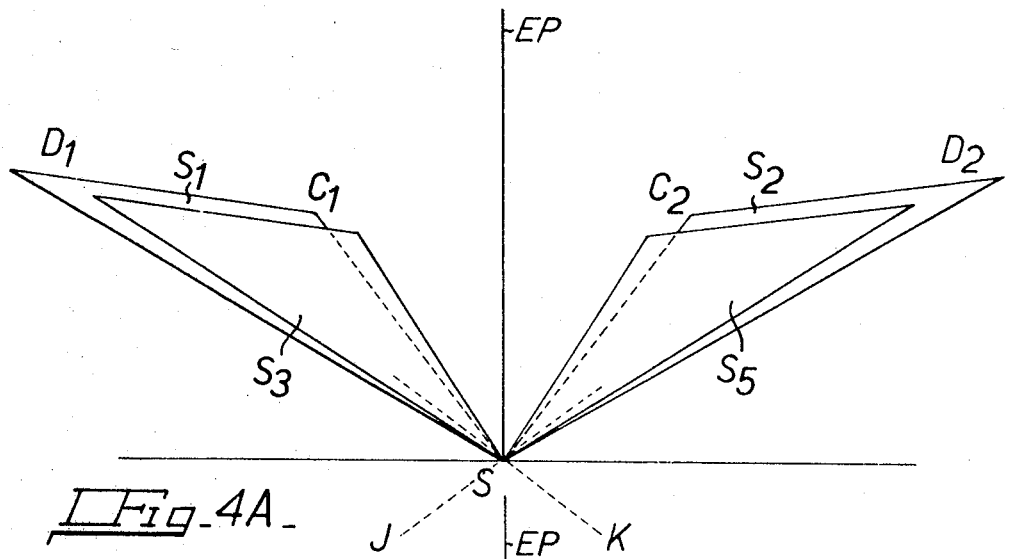
FIG. 4a, 4b and 4c, are three mutually perpendicular views of a second embodiment, shown purely diagrammatically.

Referring first to FIG. 1, a typical spectrometer comprises a curved reflecting crystal or diffraction grating C on which is incident a beam of X-rays I from a source S, and the rays are reflected along a path R into a detector D. These may be means for turning the crystal C and moving the detector D to the optimum position, so as to scan a range of wavelengths, but these need not concern us here. We define the plane of the spectrometer as that plane which contains the paths I and R of the incident and reflected rays, and in FIG. 1 this is the plane of the drawing.

For correct behaviour of the spectrometer, the relative positions of the components is critical, at least in certain directions. If the source S were to be moved in a direction A towards or away from the crystal, i.e. along the path I, by more than 2 millimetres (in a typical example) this would de-focuss the spectrometer to an unacceptable degree. If the source were to be moved, in the same example, only one tenth of a millimetre in a direction B or $B^1$, lying in the plane of the spectrometer but perpendicular to the path I, the resulting variation in signal strength at the detector D would be equally unacceptable. If, on the other hand, the source is displaced in a direction perpendicular to the plane of the spectrometer, displacements of even several millimetres have little effect. We call this the privileged direction.

However, considering a plane that contains the privileged direction and contains the path I, shifts of the source in any direction in this plane and making an angle with the privileged direction have only a second order effect, especially where the angle with the privileged direction is small. This is illustrated in FIG. 2, where the plane of the spectrometer is SCD, the privileged direction PSP[1] and the privileged plane is PCP[1]. A shift of the source in the direction SQ or SQ[1] in that plane has hardly any more effect than a shift in the privileged direction SP or SP[1], because although such shifts contain a component along the direction A, this direction is much less sensitive than the direction B, by a factor of 20 in the example mentioned above.

We make use of this knowledge in a micro-analyser layout according to the invention to place as many spectrometers as we need around the specimen whilst maintaining each of them substantially uninfluenced by scanning deflections of the beam. FIG. 3 shows one half of one example of such a layout. A finely focussed electron beam or probe EP impinges vertically on the horizontal surface of a specimen S and the X-rays given off by the point of impact are received by, in the example shown, four spectrometers $A_1$, $A_2$, $A_3$ and $A_4$, each comprising a crystal C and a detector D. It will be observed that the incident rays of all four spectrometers lie in a common plane which contains the axis of the beam or probe EP. Furthermore the planes of all four spectrometers which are substantially the same as the planes of their mounting plates or quadrants, indicated diagrammatically are all perpendicular to the abovementioned common plane. Thus this common plane is the privileged plane of all four spectrometers. It intersects the plane of the specimen surface in a line L, which we call the datum line and which thus lies in the privileged plane of all the spectrometers.

For scanning purposes, the electron beam EP is scanned along this datum line L, as indicated diagrammatically by the deflection plates E. For scanning in the other horizontal direction we move the specimen itself as indicated by the double-headed arrow F, and this, as explained earlier, has no disturbing effect on the position of the source, i.e. on the point of impact of the electron beam, as far as the spectrometers are concerned.

In the layout illustrated in FIG. 3 there are two spectrometers having their planes at 60° to the plane of the specimen and two at 20°. It is true that, especially in the case of the latter pair, the scanning of the electron beam will cause the source to move to some extent along the path of the incident ray (the path A in FIG. 1) but the amount is acceptable where the scanning amplitude is small.

It will be understood that, where the physical size of the spectrometers and the intrusion of other necessary components such as optical microscopes, scintillation counters and specimen handling equipment allow it, more than four spectrometers may be arranged in the manner shown. Furthermore we have so far only dealt with the region on one side of the datum line. An equal number of spectrometers can be arranged on the other side of the line, thus making eight spectrometers in the example shown. To avoid interference between the components of the different spectrometers the common privileged plane of each group of four may be tilted slightly about the datum line away from the common privileged plane of the other four. Also it is not essential that the electron beam should be perpendicular to the surface of the specimen. Finally, it will be understood that where we have spoken of vertical directions or horizontal surfaces this is purely for convenience in description, and in practice the instrument may be at any altitude in space.

Figure 4B:
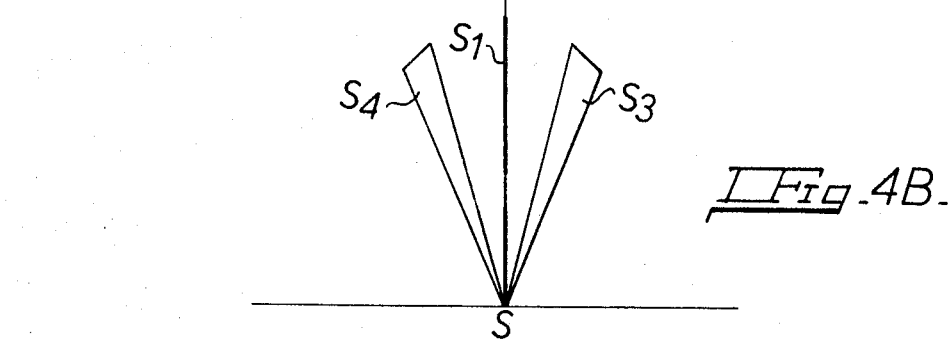
Figure 4C:
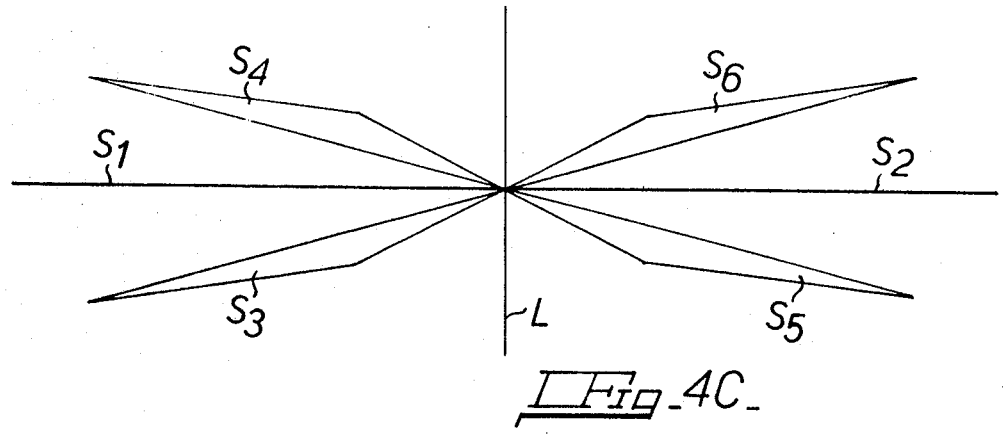

FIGS. 4a, 4b and 4c illustrate diagrammatically an alternative layout providing for six spectrometers and having the advantage that all of them have a high take-off angle from the specimen, this angle being 52½° to the plane of the specimen surface in the example shown. There are two central spectrometers S1 and S2 lying in a common plane perpendicular to the plane of the specimen surface, each comprising a crystal C and detector D; in FIG. 4a these two spectrometers lie in the plane of the drawing and the datum line, along which the electronic scanning is performed, is perpendicular to the paper. The take-off angles, are the angles between the plane of the specimen surfaces and the lines SC1 and SC2 to the crystal of these two spectrometers and are 52½°.

For these two spectrometers the least privileged direction, i.e. the direction which is perpendicular to the privileged plane and along which the source should certainly not be displaced with respect to the spectrometer is a line J (for the left-hand spectrometer S1) and a line K (for the right-hand spectrometer S2) as viewed in FIG. 4a. If we consider a first plane which is rotated about the axis J with respect to the plane of the drawing through fifteen degrees in one direction and a second plane which is rotated about the axis J through the same angle in the opposite direction we now have the planes of two more spectrometers S3 and S4 which flank the spectrometer S1 on opposite sides. Similarly two spectrometers S5 and S6 flank the spectrometer S2 on opposite sides, their planes making angles of fifteen degrees with the central plane and intersecting it in the line K.

If one simply took the line SC1 or SC2 of the spectrometer S1 or S2 and rotated that position about the line J or K respectively to obtain the positions of the spectrometers S3 to S6 their take-off angles with respect to the specimen surface would be less than 52½° so, in order to keep a uniform take-off angle for all six spectrometers, the flanking spectrometers lie in the planes specified, but displaced angularly to a small extent about the datum line L, as compared with the positions obtained by pure rotation of the spectrometers S1 and S2 about the axes J and K, respectively. The plane of each spectrometer S3 to S6 then contains a line (inclined at a small angle to J or K) flanking that is perpendicular to the datum line L and to the path of the incident rays from the point of impact of the electron beam on the specimen to the crystal of that spectrometer.

I claim:

1. A scanning electron probe X-ray microanalyser comprising means for causing a finely focussed electron beam to impinge on the surface of a specimen placed in the path of said beam, means for causing said beam to scan the surface of said specimen along a single given line transverse to the path of said beam and at least three separate dispersion-type X-ray spectrometers placed around the path of said beam to receive X-rays emanating from said specimen surface as a result of the impingement of said electron beam, each of said spectrometers defining an incident ray path, a dispersive element in said incident ray path, and an emergent ray path extending away from said dispersive element in a direction which is not collinear with said incident ray path whereby said incident and emergent ray paths define together a spectrometer plane, the placing of said spectrometers around the path of said beam being such that each spectrometer plane contains a line which is perpendicular both to said given line and to said incident ray path.

2. The micro-analyser set forth in claim 1, wherein equal numbers of said spectrometers lie on opposite sides of a plane containing said given line and the path of said beam.

3. The micro-analyser set forth in claim 1, wherein a plane perpendicular to the spectrometer plane of one of said spectrometers and containing said incident ray path of that spectrometer coincides with the corresponding plane of a second of said spectrometers.

4. The micro-analyser set forth in claim 1 wherein the angle defined between said specimen surface and said incident ray path is the same in respect of each of said spectrometers.

5. The micro-analyser set forth in claim 1 wherein said spectrometers are arranged symmetrically with respect to a plane that is perpendicular to said given line and passes through the mid-point of said given line.

6. The micro-analyser set forth in claim 1 including means for moving said specimen for scanning purposes in a direction perpendicular to said given line.

References Cited

UNITED STATES PATENTS 3,107,297 10/1963 Wittry.

FOREIGN PATENTS 1,058,166 5/1959 Germany.

ARCHIE R. BORCHELT, Primary Examiner

C. E. CHURCH, Assistant Examiner

U.S. Cl. X.R.

250—51.5